United States Patent [19]
Smith et al.

[11] Patent Number: 5,802,600
[45] Date of Patent: Sep. 1, 1998

[54] METHOD AND APPARATUS FOR DETERMINING A DESIRABLE DIRECTORY/DATA BLOCK RATIO IN A CACHE MEMORY

[75] Inventors: Kevin Frank Smith, Morgan Hill, Calif.; Kelly Carpenter, Elgin, Tex.; Gary Malcolm King, Millbrook, N.Y.

[73] Assignee: International Business Machines Corporation, Armonk, N.Y.

[21] Appl. No.: 747,721

[22] Filed: Nov. 12, 1996

[51] Int. Cl.$^6$ ................................................ G06F 12/00
[52] U.S. Cl. ..................... 711/173; 711/153; 711/130; 711/129
[58] Field of Search .................... 711/153, 130, 711/129, 173

[56] References Cited

U.S. PATENT DOCUMENTS

| | | |
|---|---|---|
| 5,043,885 | 8/1991 | Robinson . |
| 5,133,061 | 7/1992 | Melton et al. . |
| 5,151,989 | 9/1992 | Johnson et al. . |

*Primary Examiner*—Tod R. Swann
*Assistant Examiner*—Felix B. Lee
*Attorney, Agent, or Firm*—Ohlandt, Greeley Ruggiero & Perle

[57] ABSTRACT

A data processing system dynamically balances allocation of storage areas in a shared coupling facility that is devoted to storage of directory entries and data blocks. Each directory entry includes information regarding the validity of a data block that is locally stored by one or more processor modules in the data processing system. The system includes a coupling facility having a cache memory wherein a first portion is allocated to storage of data blocks and a second portion is allocated to storage of directory entries. Each directory entry, associated with a data block, indicates the validity or invalidity of data contained in a copy of the data block maintained by a connected computer module in its local memory. Each computer module, upon requiring a first data block and determining that (i) the first data block is present in its local memory (i.e., a buffer "hit"), but (ii) is not marked valid and (iii) is not present in the coupling facility (i.e., a cache "miss"), accesses the first data block from a disk store, even though the first data block in its local memory may be valid. A memory allocation procedure controls the sizes of the first portion and second portion of the cache memory. The procedure (i) maintains a record, per unit of time, of a number of cache "miss" occurrences, (i.e., a cache "miss" rate) and an estimate of the number of false invalidation occurrences (i.e., a false invalidation rate); derives a first order derivative of the sum of cache miss-rate and the estimated false invalidation rate and (iii) employs the derivative to adjust the sizes of the first portion and second portion of the cache memory so as to minimize the sum of the expected miss and false invalidation rate values.

21 Claims, 3 Drawing Sheets

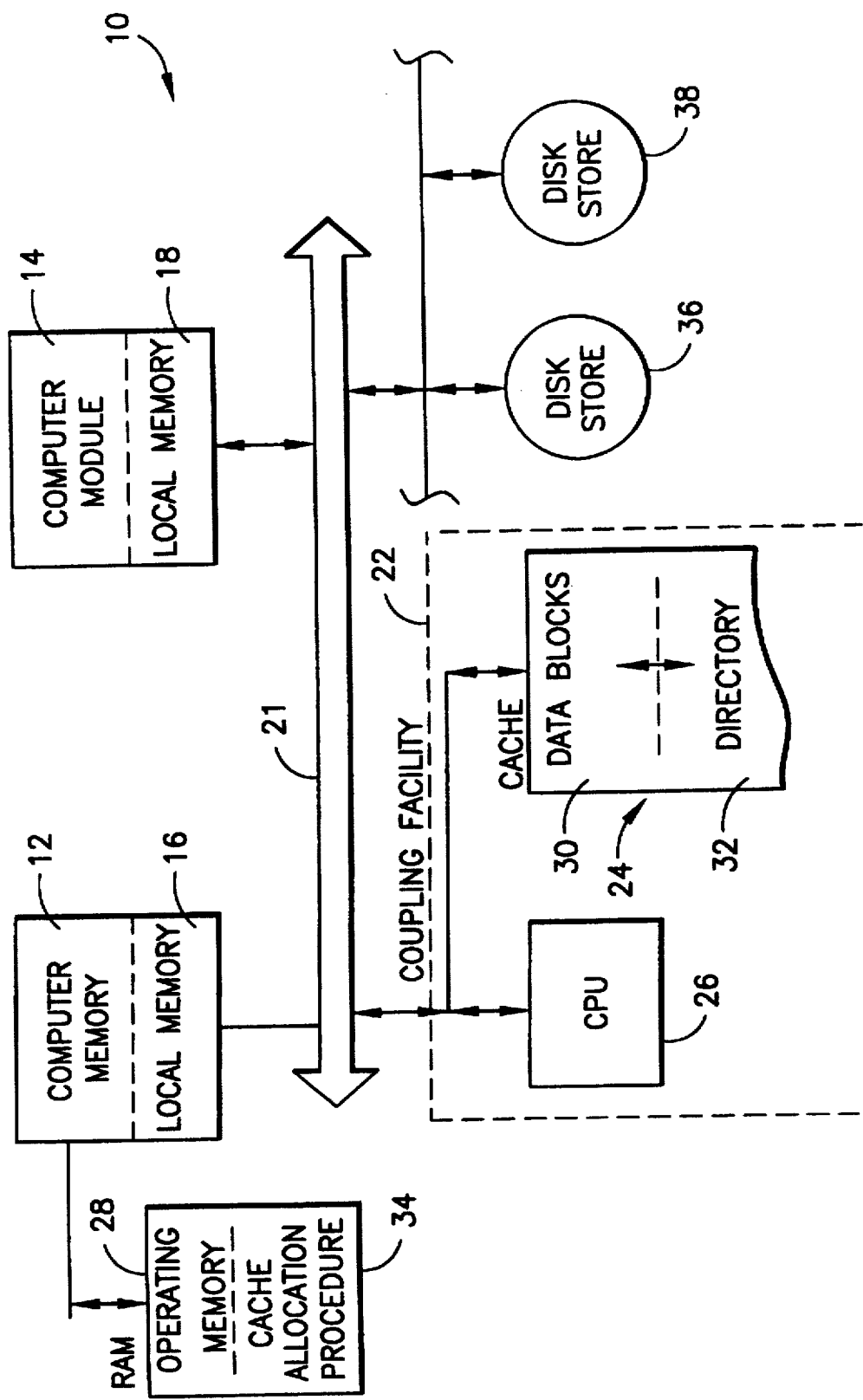

METHOD AND APPARATUS FOR DETERMINING A DESIRABLE DIRECTORY/DATA BLOCK RATIO IN A CACHE MEMORY

FIELD OF THE INVENTION

This invention relates to cache memory management and, more particularly, to a method and apparatus for determining an optimum ratio of directory information and data blocks in a cache memory.

BACKGROUND OF THE INVENTION

Modern computing systems often employ multiple computing modules that are interconnected via coupling facilities. A computer module may include multiple individual central processing units and a coupling facility often includes a cache memory that is accessible by any of a plurality of the computer modules. Such computing systems are applied to highly complex problems, wherein parallel processing enables achievement of rapid solutions. Thus, such a computing system is designed so that the individual computer modules share information among themselves. Sharing of such information, in a reliable manner, implies that an update to shared data by one computer module in the computing system will always cause that updated data to be seen by any other computer module which happens to examine the same data at a later moment in time. Thus, in such systems, if an area of data has been updated by one computer module, no other computer module is able to access an "old" version of that data, even when that old version is found within the computer module's own local buffer space.

Validity of data, that is accessible by plural computer modules, is maintained by assuring (1) that the coupling facility is notified of all updates to data; (2) that a directory in the coupling facility is updated to indicate that the cache memory in the coupling facility now contains updated data; and (3) that the updated data is backed up by being written to a direct access storage device, i.e., disk storage.

The coupling facility further maintains the integrity of data updates by maintaining a directory of all computer modules which share the information presently stored in cache in the coupling facility. The coupling facility enables validity tags to be written back to the various computer modules to indicate that their locally stored data is either valid/invalid, as the case may be.

The following scenarios will indicate methods whereby data integrity is insured amongst computer modules which share common data in a coupling facility. If it is assumed that computer module A requires data from a data block X and finds that it does not presently hold a local copy of data block X, computer module A requests data block X from the coupling facility (hereinafter referred to as the CF). If the CF does not hold data block X (i.e., a cache "miss"), then data block X is requested from external media —which always holds it—such external media being, for instance, a disk drive. Data block X is then copied to both the CF cache and to the local buffer space of computer module A.

Assume now that computer module B requires data from data block X. If computer module B does not contain a local copy of data block X, it requests a copy from the CF, which now contains such copy. The requested copy is transmitted to the local buffer memory of computer module B. If computer module B updates data block X, and creates data block X', a copy of data block X' is sent to the CF. Meanwhile, computer module A's local buffer still contains a data block X (and not X'). However, the CF "knows" that computer module A contains a non-updated copy, and before computer module A is able to utilize its local copy of data block X, the CF informs computer module A that data block X is not updated. This action occurs before computer module A experiences a "hit" ( i.e., an indication that data block X is present in its local memory), when it attempts to access its local copy of data block X. Before using data block X, computer module A checks with the CF to verify that its copy is valid. When CF replies that the copy is not valid, computer module A requests an update from CF, which then transmits data block X' to computer module A. Thereafter, computer module A utilizes data block X'.

The CF preferably includes a directory entry for each data block which, in addition to indicating the validity/invalidity of the associated data block, further identifies which computer modules are utilizing the data block. A data block can be of several different sizes and a directory entry's size is typically approximately ⅛ or 1/16 of the associated data block itself. The storage of the directory entries requires an approximate 10% in overhead in cache memory capacity.

The benefit of the directory entries is that even if the associated data block is not stored in the CF, the directory entry supplies information regarding the validity/invalidity of the data block. That information can be accessed by the computer modules to enable them to determine whether their local copies of the data block can reliably be used. Without this information, the computer modules are invariably forced to conclude that their local copy is invalid.

The following scenario will illustrate the interrelationship between plural computer modules and the CF, when the CF only maintains a directory entry and not the associated data block. If it is now assumed that computer module A requires data from data block X, and that data block X is not stored in the computer module's local buffer, computer module A incurs a "miss" (i.e., indicating an absence of an addressed data block in the local memory). As a result, computer module A checks with the CF, and the CF also indicates a "miss", indicating that the data block is not stored therein. In response, computer module A fetches data block X from disk memory and places a copy into both its own local buffer as well as into the CF. However, assume that the CF stores only the directory entry and throws away data block X (e.g., because it lacks the necessary storage space). If computer module B then requests data block X, it incurs a "miss" in both its own local buffer as well as in the CF. Computer module B then fetches data block X from disk memory and places a copy into its local buffer and provides one to the CF, which is thrown away again.

Now, when computer module B updates data block X to data block X', both the CF and disk memory are provided with copies of data block X. The CF notes that data block X' has been changed, but once again discards data block X'. The disk memory records data block X'. Because the CF has noted that data block X' has been altered, later when computer module A attempts to utilize its local copy of data block X, it is notified by the CF that its copy is invalid. Computer module A is then forced to re-fetch the data block X'from disk memory, which always contains the most updated copy of the data.

The above-noted second scenario is not as desirable as the first one, in that several additional disk fetches are required that are not required in the first scenario. Functionally, everything works correctly—just slower. Ideally, the CF should contain both data blocks and their directory entries whenever possible. However, when that is not possible, if at least the directory entries are maintained in the CF, then local, valid buffer hits will always be allowed to proceed without requiring a disk access.

The above data management procedure presents a problem when there is not enough CF memory capacity to hold all of the data blocks and directories entries. Clearly, it is preferred to retain in cache both directory entries and data blocks for data blocks that are locally buffered in the computer modules. A procedure is thus required which enables an estimation of an appropriate mixture of directory entries and data blocks in the CF cache. Further, it is desired that this mixture be dynamic so as to respond to demands of the workload of the individual communicating computer modules.

In determining an appropriate mixture for both directory entries and data blocks, several effects are in opposition. If there are too few directory entries, then false invalidations will occur. A false invalidation is a forced invalidation of a locally buffered data block in a computer module, when the data is valid. Detection of a false invalidation event arises when a computer module determines:

(1) that a required data block is present in its local buffer;
(2) that the required data block is not present in the CF (i.e. a cache miss); and
(3) that the CF indicates that the data block is "invalid".

The occurrence of all three of the aforementioned events indicates that either (1) there is a "real" invalidation, and only the directory entry is present in the CF (typically a rare event) or (2) there is a false "invalidation". (Remember that the CF is forced to invalidate data for which it has no directory entry for a corresponding data block).

Each occurrence of a false invalidation requires an unnecessary access to disk memory which slows the overall processing rate. Thus, if there are too few directory entries, it is possible that additional false invalidations will occur, whereas if there are too many directory entries, implying a reduction in the number of cached data blocks in the CF, then the CF read "hit" number will degrade, requiring additional disk accesses.

Accordingly, it is an object of this invention to provide an improved system and method for controlling allocation of cache memory space as between directory entries and data blocks.

It is another object of this invention to provide an improved system and method for controlling allocation of cache memory space which minimizes both false invalidations and cache read misses.

SUMMARY OF THE INVENTION

A data processing system dynamically balances allocation of storage areas in a shared coupling facility that is devoted to storage of directory entries and data blocks. Each directory entry includes information regarding the validity of a data block that is locally stored by one or more processor modules in the data processing system. The system includes a coupling facility having a cache memory wherein a first portion is allocated to storage of data blocks and a second portion is allocated to storage of directory entries. Each directory entry, associated with a data block, indicates the validity or invalidity of data contained in a copy of the data block maintained by a connected computer module in its local memory. Each computer module, upon requiring a first data block and determining that (i) the first data block is present in its local memory (i.e., a buffer "hit"), but (ii) is not marked valid and (iii) is not present in the coupling facility (i.e., a cache "miss"), accesses the first data block from a disk store, even though the first data block in its local memory may be valid. A memory allocation procedure controls the sizes of the first portion and second portion of the cache memory. The procedure (i) maintains a record, per unit of time, of a number of cache "miss" occurrences, (i.e., a cache "miss" rate) and an estimate of the number of false invalidation occurrences (i.e., a false invalidation rate); derives a first order derivative of the sum of cache miss-rate and the estimated false invalidation rate and (iii) employs the derivative to adjust the sizes of the first portion and second portion of the cache memory so as to minimize the sum of the expected miss and false invalidation rate values.

BRIEF DESCRIPTION OF THE DRAWINGS

FIG. 1 is a block diagram of a modular computing system incorporating the invention.

DETAILED DESCRIPTION OF THE INVENTION

Figure 2A:
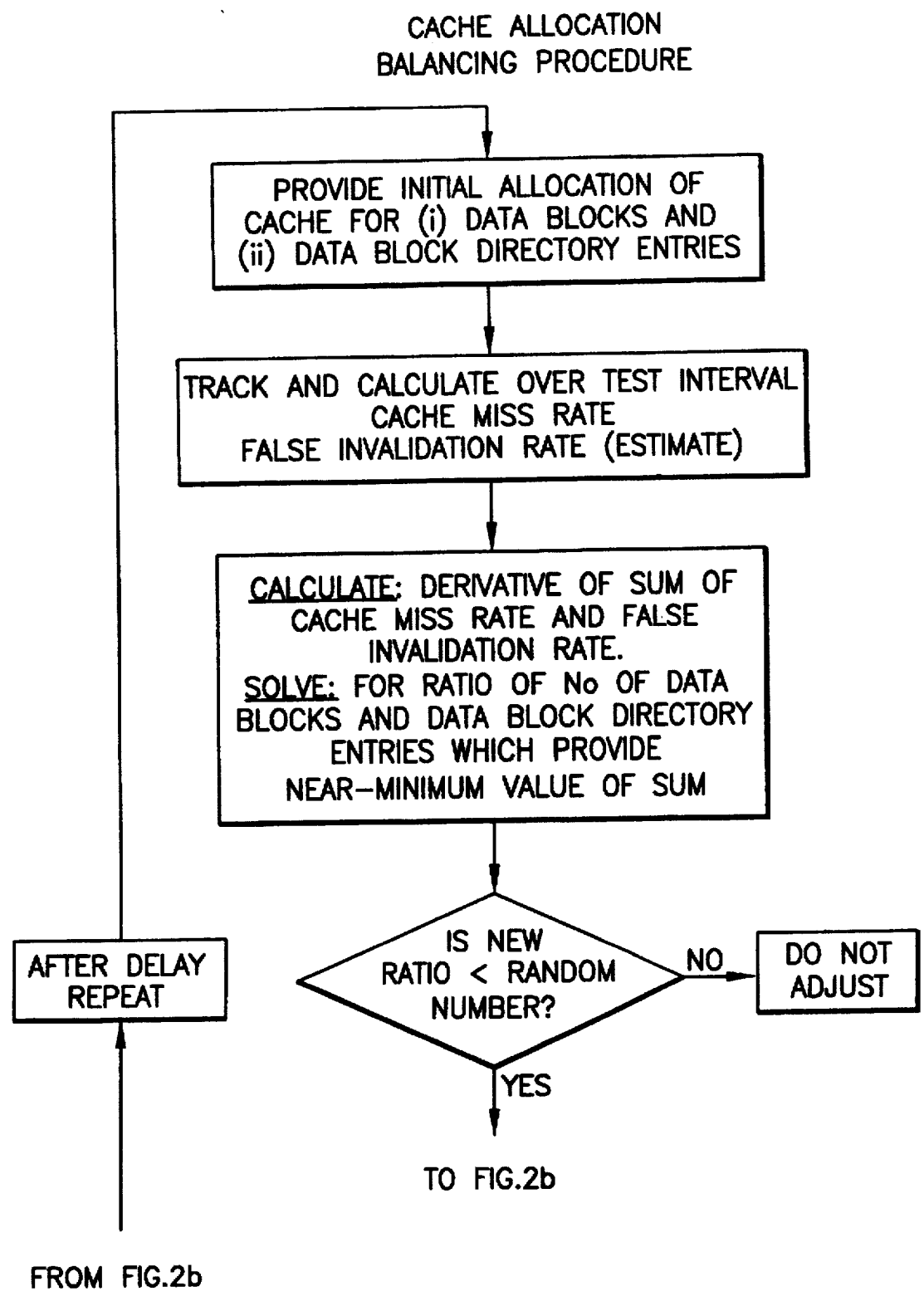
FIGS. 2a and 2b illustrate a high level logic flow diagram of the procedure of the invention.

Referring to FIG. 1, computing system 10 comprises a plurality of computer modules 12, 14, etc., each including a local memory (e.g., 16, 18, . . . respectively) and a random access operating memory 20. Each computer module is coupled via bus system 21 to a coupling facility (CF) 22 and a plurality of disk stores 36, 38, etc. which provide mass storage facilities for computing system 10. CF 22 includes a cache memory 24 and a central processing unit (CPU) 26. Cache memory 24 contains a first region 30 that is allocated for storage of data blocks and a second region 32 that is allocated for storage of directory entries for data blocks.

The amount of cache memory 24 allocated as between regions 30 and 32 is controlled by a cache allocation procedure 34, operating in conjunction with computer module 12. Cache allocation procedure 34 also determines which data blocks and/or data entries are to be removed from cache 24 to make room for newly added data blocks and directory entries. Cache allocation procedure can also be resident in CF 22 or in any other computer module.

Interactions between computer modules 12 and 14 and CF 22 are much the same as described above in the Background of the Invention section. More specifically, if a computer module finds a "hit" for a required data block in its local memory, it next determines whether the locally stored data block is valid/invalid. If a directory entry in cache 24 indicates that it is invalid, the computer module determines if CF 22 includes the required data block, and if not, accesses the required data block from a disk store. A disk access also occurs if both the required data block and the corresponding directory entry are both absent from cache 24, as there is no way of knowing whether the local copy of the data block is valid (even though it has been declared invalid by CF 22—a false invalidation) or is invalid and has been declared invalid by CF 22 (i.e., a real invalidation).

Clearly, if the required data block is present in memory region 30, computer module 12 merely needs to access the updated data block therefrom to assure that its local memory copy is fully updated.

To adjust the sizes of cache regions 30 and 32, computer module 12 causes execution of cache allocation procedure 34 on a periodic basis. This procedure minimizes the sum of false invalidations and read misses in cache 24 by counting these two events (in the case of false invalidations, estimating the count) and then predicting their values based upon different cache size allocations. Cache allocation procedure 34 then picks a point which is predicted to minimize the total penalty and, because the process is dynamic, moves towards the "ideal" in steps and continues to re-estimate the "ideal" allocation over time. This action enables the cache allocations to be altered so as to adapt to changes in workload and to inaccuracies in the procedure, itself.

In order to implement cache allocation procedure 34, it is necessary to collect the following information for a "test" interval, which is an interval over which the collected data will be used to arrive at certain performance metrics.

1. The average number of directory entries.
2. The average number of physical data blocks in cache memory 22.
3. The average number of logical data blocks in cache memory 22 (each logical data block comprising one or more physical data blocks).
4. The number of CF read misses.
5. The number of false invalidations.

Statistics 1-4 are readily captured by cache allocation procedure 34 because the average number of directory entries and data entries are recorded. More specifically, cache allocation procedure 34 records the number of directory entries, logical data blocks and physical data blocks at the beginning of the test interval and the number thereof at the end of the test interval and then takes the average of the respective values. The counts of the number of CF read misses is only those Read misses which occur over the test interval.

The number of false invalidations during the test interval is a count that is incremented each time the following events occur in response to a given data reference:

1. A local memory read "hit" occurs, indicating that the data block containing the requested data is present in local memory (e.g., 16, 18); and
2. CF 22 declares the data block "invalid"; and
3. there is a CF read miss, (i.e., the data block is missing from cache 24).

Note that CF 22 will declare a data block "invalid" any time a directory entry for the data block is removed from directory region 32. Thus, even though the copy of the data block in local memory is valid, the computer module is forced to handle it as invalid due to the lack of a directory entry in directory region 32. The number of detected false invalidations is an estimate because it is not always accurate. For instance, if a data block is really invalidated, and the data block has been removed from cache 22 (e.g. because it was a least recently used block), the invalidation is "real" but is counted as a "false" invalidation.

If the required data block is present in region 30, so also is the directory entry (in region 32). Thus, valid/invalid information is accurate and the possibility of a false invalidation is avoided.

Figure 2B:
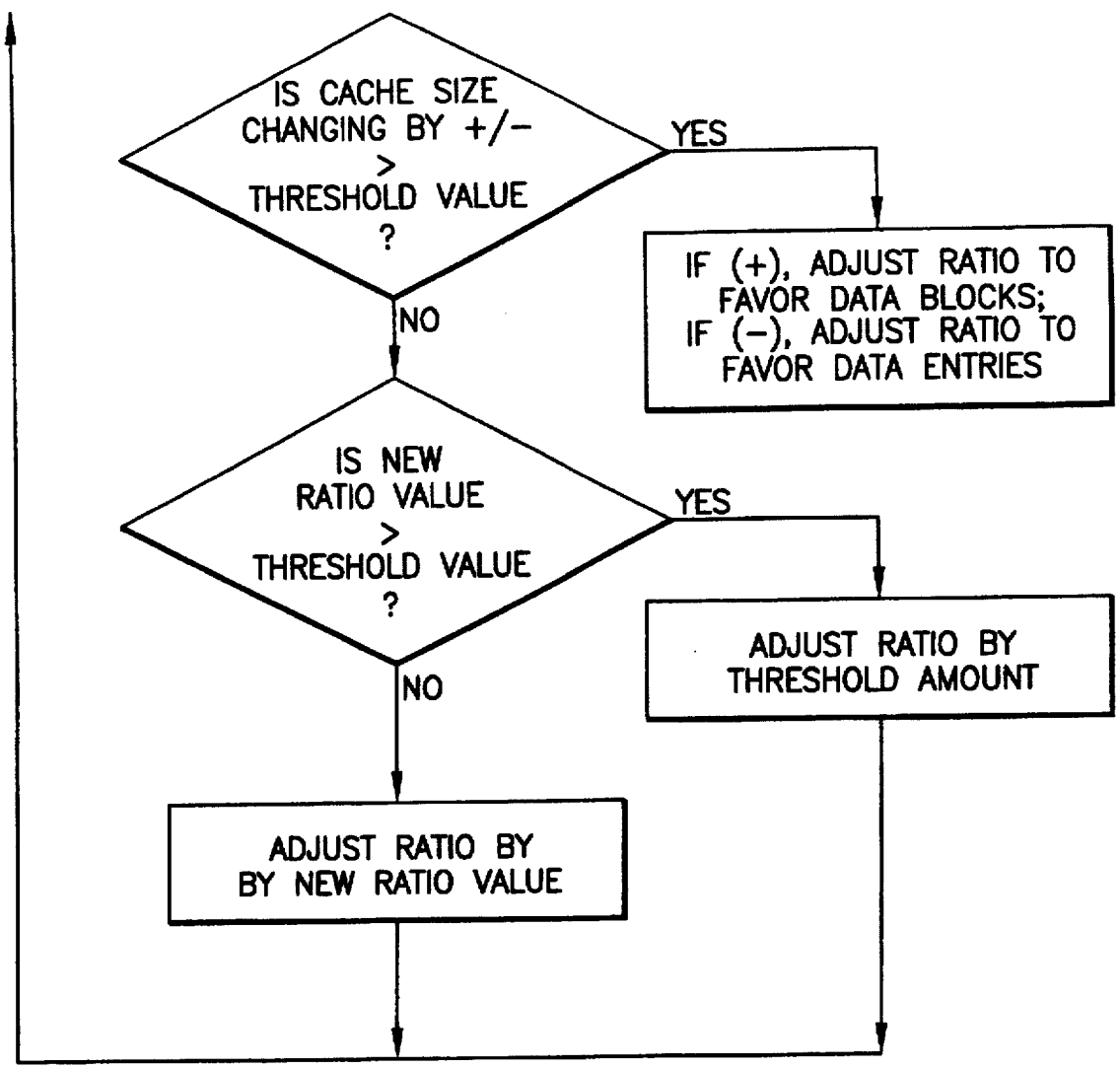

As will be hereafter understood, cache allocation procedure 34 periodically re-allocates regions 30 and 32 of cache 24 by calculating a cache miss-rate; a false invalidation rate and then minimizes the expected sum of the two values. The minimization is accomplished by calculating a derivative of the expected sum of the rates; setting the resultant function equal to 0; and solving for both the near optimal number of cache data blocks and the near optimal number of directory entries. The procedure of the invention is illustrated in FIGS. 2a and 2b.

Hereafter, the following variables are employed:
c=average number of cache physical data blocks during the test interval;

m=number of CF read misses;
d=average number of directory entries during the test interval;
f=number of false invalidation;
w=average number of physical data blocks per logical data block;
K=number of directory entries comprising a physical data block memory size (hereafter assumed=8);
c'= adjusted number of logical data blocks;
d'= adjusted number of directory entries.

Variables c' and d' may be computed as follows:

$$c'=\text{Min}((m-f)(Kc+d)/(Km+(K/4)f), w(Kc+d/(Kw+1)) \quad (1)$$

$$d'=K(c-c')+d \quad (2)$$

If K=8, equations 1 and 2 become:

$$c'=\text{Min}((m-f)(8c+d)/(8m+2f), W(8c+d)/(8w+1)) \quad (1)$$

$$d'=8(c-c')+d \quad (2)$$

Equations (1) and (2) are simplified approximations of the rate derivations of cache read misses and false invalidations. Equations (1) and (2) are derived based upon the following logic and computations. Every time a false invalidation occurs, CF 22 is checked to see if it has a copy of the data, thus incurring an additional CF miss in addition to the false invalidation itself. It becomes necessary, therefore, to subtract the false invalidation count from the CF miss count. A new statistic M is defined as the number of CF misses, without false invalidations, and is calculated as:

$$M=m-f$$

It has been determined, as a crude rule of thumb, that the cache miss ratio drops linearly as the size of the cache grows exponentially. For instance, a cache miss rate drops by ½ each time the size of the cache grows $2^7$ or 128 times. Thus, a new expected miss rate M' (for caching of records/data blocks)can be expressed as:

$$M'=e^{(\ln c - \ln c')/7 + \ln M} \quad (3)$$

Equivalently, a new expected false invalidation rate for a directory entry size of d' can be expressed as:

$$f'=e^{(\ln d - \ln d')/5.6 + \ln f} \quad (4)$$

The value 5.6 in equation (4) is an approximate median value logarithmically falling between the $\log_2 (32)$ and the $\log_2 (64)$.

In order to minimize the total number of expected misses, be they false invalidations and/or CF misses, the sum of M' and f' needs to be minimized. However, it is noticed that because the CF memory is a finite size, a relationship exists between the number of data blocks 30 and the size of directory 32, and it is assumed that directory entries are ⅛th of the size of a physical data block:

$$d'=8(c-c')+d \quad (5)$$

with the constraint that: d'≥c'.

In summary, it is desired to minimize the following sum:

$$e^{(\ln c - \ln c')/7 + \ln M} + e^{(\ln d - \ln(8(c-c')+d))/5.6 + \ln f}$$

To minimize the above sum, the derivative is taken with respect to c' and the resulting function is set equal to 0. In addition, certain simplifications are used. For instance, all terms which are taken to the 5th root or higher are assumed to be approximately 1. Further, since an appropriate factor in extrapolating the false invalidate factor is unknown, it is arbitrarily selected between 32 and 64. By selecting a factor of 52.4, the function simplifies itself, resulting in equations (1) and (2) above.

To compute the desired directory/data block ratio, the following function is then solved:

$$r=d'/c'$$

The alteration of the directory/data block ratio can be calculated rapidly without undue computational expense; however, it is preferred to leave the ratio unchanged for as long as possible. To assure, however, that the ratio adjustment procedure is run periodically, a threshold may be established so that when the number of CF read misses exceeds the threshold, the directory/data ratio adjustment procedure is executed. The threshold should be adjusted so that the procedure executes, for example, every 5 to 10 minutes. Thus, for instance, whenever the number of CF read misses is equal to or exceeds $2^{16x}$ the number of computer modules, the procedure should be executed. Clearly, the setting of the threshold requires an understanding of the statistics of the particular modular computing system and may be altered by the knowledgeable user.

A preferred method for controlling the frequency of alteration of the directory/data block ratio, is to utilize a probability function. The main reason for altering the frequency of execution of the ratio adjustment procedure is to avoid the processing overhead in CF 22 that is associated with making the change. A change should not be made to the data block/directory entry ratio unless the change is significant and/or a long time has expired since it was last changed. The method first determines how much to change the ratio. Then the new ratio is compared to the current ratio and a difference value is determined. That difference value is compared to a randomly generated number and if it exceeds the value of the random number, the ratio is altered. Otherwise, the change procedure is skipped until the next iteration of the cache allocation procedure.

Under certain circumstances, the size of memory allocated for use as cache 24 may change, e.g. during start-up, and thus the operation of cache allocation procedure may provide skewed results. To prevent such an occurrence, track is kept of both the number of directory entries and data blocks in cache 24. When both the number of directory entries and data blocks has increased by more than a threshold value, or when both values have decreased by more than a threshold value, it is assumed that the size of cache 24 is changing. In such case, the increase or decrease is eliminated from the calculation and the allocation is determined as above described. Thereafter, if the size of the cache was determined to be increasing, the increased cache size is allocated by a predetermined ratio which favors storage space for data blocks. By contrast, if the size of the cache was determined to be decreasing, the decreased cache size is allocated by a predetermined ratio which favors storage space for directory entries.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for dynamically balancing storage allocations in a computer system that includes cache memory that is accessible from plural computer modules, each computer module including local memory for storage of data blocks, the cache memory including a first portion for storing plural data blocks and a second portion for storing directory entries, each directory entry including information regarding a validity status of an associated data block, said method comprising the steps of:

a) maintaining a first record of a number of cache misses over a time period, each cache miss occurring when a computer module does not find a desired data block resident in said cache memory;

b) maintaining a second record of a number of false invalidations over a time period, each false invalidation occurring when a desired data block is resident in a computer module's local memory but a directory entry for said desired data block with a validity status indication therefor, is absent from said cache memory; and c) employing said first record and second record to adjust a ratio of size allocations of said first portion and second portion so as to reduce at least one of said number of false invalidations and number of cache misses.

2. The method as recited in claim 1, wherein step c) includes the further step of:

c1) employing a derivative of a sum of (i) a cache miss rate derived from said first record, and (ii) a false invalidation rate derived from said second record, to determine a cache miss value and a false invalidation value, which together minimize said derivative.

3. The method as recited in claim 1, wherein said employing step c) is performed at intervals to re-adjust said ratio of said size allocations of said first portion and second portion.

4. The method as recited in claim 3, wherein employing step c) re-adjusts said ratio of said size allocations of said first portion and second portion only if a difference of said ratio before adjustment and said ratio after adjustment exceeds a randomly derived value.

5. The method as recited in claim 3, wherein employing step c) re-adjusts said ratio of said size allocations of said first portion and second portion by a full determined amount only if said full determined amount does not exceed a threshold value, and if said full determined amount does exceed said threshold value, adjusting said ratio by a value less than said full determined amount.

6. The method as recited in claim 2, wherein said employing step c) is inhibited if a number of data blocks and directory entries in said cache memory increases or decreases, as the case may be, by a value greater than a preset value.

7. The method as recited in claim 2, wherein said processor means adjusts said ratio by use of the following expressions:

$$c'=Min((m-f)(Kc+d)/(Km+(K/4)f), w(Kc+d)/(Kw+1))$$

$$d'=K(c-c')+d$$

where:

c=average no. of physical data blocks in cache during a test interval;

m=number of cache misses;

d=average number of directory entries during said test interval;

f=number of false invalidations;

w=average number of physical data blocks per logical data block;

K=number of directory entries in a physical data block memory size c′= adjusted number of logical data blocks;
d′= adjusted number of directory entries.

8. A memory device including a procedure for dynamically balancing storage allocations when used in conjunction with a computer system, said computer system including cache memory that is accessible from plural computer modules, each computer module including local memory for storage of data blocks, the cache memory including a first portion for storing plural data blocks and a second portion for storing directory entries, each directory entry including information regarding a validity status of an associated data block, said memory device comprising:

means for maintaining a first record of a number of cache misses over a time period in respect of said cache memory, each cache miss occurring when a computer module does not find a desired data block resident in said cache memory;

means for maintaining a second record of a number of false invalidations over a time period, each false invalidation occurring when a desired data block is resident in a computer module's local memory but a directory entry for said desired data block with a validity status indication therefor, is absent from said cache memory; and means for controlling a processor present in said computer system to employ said first record and second record to adjust a ratio of size allocations of said first portion and second portion so as to reduce at least one of said number of false invalidations and number of cache misses.

9. The memory device as recited in claim 8, wherein said means for controlling employs a derivative of a sum of (i) a cache miss rate derived from said first record, and (ii) a false invalidation rate derived from said second record, to determine a cache miss value and a false invalidation value, which together minimize said derivative.

10. The memory device as recited in claim 8, wherein said means for controlling operates at repeated intervals to re-adjust said ratio of said size allocations of said first portion and second portion.

11. The memory device as recited in claim 10, wherein said means for controlling re-adjusts said ratio of said size allocations of said first portion and second portion only if a difference of said ratio before adjustment and said ratio after adjustment exceeds a randomly derived value.

12. The memory device as recited in claim 10, wherein said means for controlling re-adjusts said ratio of said size allocations of said first portion and second portion by a full determined amount only if said full determined amount does not exceed a threshold value, and if said full determined amount does exceed said threshold value, adjusting said ratio by a value less than said full determined amount.

13. The memory device as recited in claim 8, wherein, if a number of data blocks and directory entries in said cache memory increases by a value greater than a preset value, at least a portion of said cache memory that increased in size is allocated in accord with a ratio which favors a space allocation for data blocks as contrasted to directory entries.

14. The memory device as recited in claim 8, wherein, if a number of data blocks and directory entries in said cache memory decreases by a value greater than a preset value, at least a portion of said cache memory that decreased in size is allocated in accord with a ratio which favors a space allocation for directory entries as contrasted to data blocks.

15. The memory device as recited in claim 9, wherein said means for controlling adjusts said ratio by use of the following expressions:

$$c' = \text{Min}((m-f)(Kc+d)/(Km+(K/4)f), w(Kc+d)/(Kw+1))$$

$$d' = K(c-c') + d$$

where:
c=average no. of physical data blocks in cache during a test interval;
m=number of cache misses;
d=average number of directory entries during said test interval;
f=number of false invalidations;
w=average number of physical data blocks per logical data block;
K=number of directory entries in a physical data block memory size
c′=adjusted number of logical data blocks;
d′=adjusted number of directory entries.

16. A data processing system including means for dynamically balancing storage allocations of a cache memory in a shared cache memory, the cache memory storing directory entries and data blocks, each directory entry including information regarding validity of at least a data block locally stored with one or more processor modules in said data processing system, said data processing system comprising:

a cache memory with a first portion allocated for storage of data blocks and a second portion allocated for storage of directory entries, each directory entry indicating a validity status indication for data contained in a data block;

plural computer modules coupled to said cache memory, each having local memory for storage of data blocks, a processor module, upon requiring a first data block and determining that (i) said first data block is present in local memory in said processor module, (ii) and neither a directory entry corresponding to said first data block or a copy of said first data block is present in said cache memory (i.e., a cache miss), performing an access of said first data block from a disk store, even though said first data block in local memory may be valid, (i.e., a false invalidation); and processor means associated with said coupling facility for controlling a ratio of sizes of said first portion and second portion by a memory allocation procedure, said procedure (i) maintaining a record of a number of cache miss occurrences (i.e., a cache miss rate) and of a number of false invalidation occurrences (i.e., a false invalidation rate) (ii) deriving a function of a sum of said cache miss rate and said false invalidation rate and (iii) employing said function to adjust said ratio of said sizes of said first portion and second portion.

17. The data processing system as recited in claim 16, wherein said processor means adjusts said ratio of said sizes of said first portion and second portion by selecting a ratio which minimizes said function.

18. The data processing system as recited in claim 16, wherein said processor means periodically adjusts said ratio of said sizes of said first portion and second portion.

19. The data processing system as recited in claim 18, wherein said processor means re-adjusts said ratio of said size allocations of said first portion and second portion only if a difference of said ratio before adjustment and said ratio after adjustment exceeds a randomly derived value.

20. The data processing system as recited in claim 18, wherein said processor means re-adjusts said ratio of said size allocations of said first portion and second portion by a full determined amount only if said full determined amount does not exceed a threshold value, and if said full determined amount does exceed said threshold value, adjusting said ratio by a value less than said full determined amount.

21. The data processing system as recited in claim 17, wherein said processor means re-adjusts said ratio to favor data blocks if a number of data blocks and directory entries in said cache memory increases by a value greater than a preset value or re-adjusts said ratio to favor directory entries if a number of data blocks and directory entries in said cache memory decreases by a value greater than a preset value.

* * * * *